(12) United States Patent
Popovici et al.

(10) Patent No.: US 9,594,176 B1
(45) Date of Patent: Mar. 14, 2017

(54) FAST BEAM MIGRATION USING PLANE-WAVE DESTRUCTOR (PWD) BEAM FORMING

(71) Applicants: Z TERRA INC., Houston, TX (US); ARAMCO SERVICES COMPANY, Houston, TX (US)

(72) Inventors: Alexander M. Popovici, Katy, TX (US); Sergey Fomel, Austin, TX (US); Nicolay Tanushev, Houston, TX (US); Iulian F. Musat, Katy, TX (US); Ioan Sturzu, Houston, TX (US); Constantinos X. Tsingas, Dhahran (SA)

(73) Assignees: Z TERRA INC., Houston, TX (US); ARAMCO SERVICES COMPANY, Houston, TX (US)

( * ) Notice: Subject to any disclaimer, the term of this patent is extended or adjusted under 35 U.S.C. 154(b) by 812 days.

(21) Appl. No.: 13/956,127

(22) Filed: Jul. 31, 2013

Related U.S. Application Data

(60) Provisional application No. 61/678,358, filed on Aug. 1, 2012.

(51) Int. Cl.
*G01V 1/28* (2006.01)
(52) U.S. Cl.
CPC .................... *G01V 1/282* (2013.01)
(58) Field of Classification Search
CPC combination set(s) only.
See application file for complete search history.

(56) References Cited

U.S. PATENT DOCUMENTS 9,013,956 B2   4/2015   Hill

OTHER PUBLICATIONS

Sergey Fomel, Three-Dimensional Seismic Data Regularization, Mar. 2001, Stanford Exploration Project No. 107.*
Popov, M.M. "A New Method of Computation of Wave Fields using Gaussian Beams," Wave Motion vol. 4 Issue 1, pp. 85-97, North-Holland Publishing Company, Amsterdam, Netherlands, Jan. 1982.
Da Costa et al., "Gaussian Beam Migration," Expanded Abstracts for the 59th Annual International Meeting of the Society of Exploration Geophysicists, pp. 1169-1171, Tulsa, Oklahoma, Oct. 1989.

(Continued)

*Primary Examiner* — Luke Ratcliffe
(74) *Attorney, Agent, or Firm* — Law Office of Andrei D Popovici, PC

(57) ABSTRACT

In some embodiments, input seismic data is decomposed into Gaussian beams using plane wave destructor (PWD) filters. The beams are used in a fast beam migration method to generate a seismic image of a subsurface volume of interest. PWD filters are applied to groups of neighboring traces to generate a field of dips/curvatures that fit the input trace data. Beam wavelets are then formed according to the dip/curvature field. Multiple dips (PWD slopes) may be determined at each location in time/space in order to handle intersecting reflection events. Exemplary methods allow an improvement in processing speed by more than an order of magnitude as compared to standard industry techniques such as Kirchhoff migration.

24 Claims, 5 Drawing Sheets

(56) References Cited

OTHER PUBLICATIONS

Hill, N. Ross, "Gaussian Beam Migration," Geophysics vol. 55 No. 11, pp. 1416-1428, Society of Exploration Geophysicists, Tulsa, Oklahoma, Nov. 1990.
Claerbout, Jon F., "Earth Soudings Analysis: Processing versus Inversion," Blackwell Science, Oxford, United Kingdom, Nov. 1, 1991.
Claerbout et al., "Two-dimensional textures and prediction-error filters," 61st Annual Meeting of the European Association of Exploration Geophysicists, Helsinki, Finland, 1999; the year of publication is sufficiently earlier than the effective U.S. filing date and any foreign priority date so that the particular month of publication is not in issue.
Sun et al., "3-D prestack Kirchhoff beam migration for depth imaging," Geophysics vol. 65 No. 5, pp. 1592-1603, Society of Exploration Geophysicists, Tulsa, Oklahoma, Oct. 2000.
Sun et al., "A beam approach to Kirchhoff depth imaging," The Leading Edge vol. 19 No. 11, pp. 1168-1173, Society of Exploration Geophysicists, Tulsa, Oklahoma, Nov. 2000.
Hill, N. Ross, "Prestack Gaussian-beam depth migration," Geophysics vol. 66 No. 4, pp. 1240-1250, Society of Exploration Geophysicists, Tulsa, Oklahoma, Aug. 2001.
Fomel, Sergey, "Applications of plane-wave destruction filters," Geophysics vol. 67 No. 6, pp. 1946-1960, 2002; the year of publication is sufficiently earlier than the effective U.S. filing date and any foreign priority date so that the particular month of publication is not in issue.
Nowack et al., "Gaussian beam migration for sparse common-shot and common-receiver data," Society of Exploration Geophysicists Technical Program Expanded Abstracts, pp. 1114-1117, Tulsa, Oklahoma, 2003; the year of publication is sufficiently earlier than the effective U.S. filing date and any foreign priority date so that the particular month of publication is not in issue.
Sun et al., "3D wavepath migration," Geophysical Prospecting vol. 51 Issue 5, pp. 421-430, European Association of Geoscientists and Engineers, Houten, Netherlands, Sep. 2003.
Gray, Samuel H., "Gaussian beam migration of common-shot records," Geophysics vol. 70 No. 4, pp. S71-S77, Society of Exploration Geophysicists, Tulsa, Oklahoma, Aug. 2005.
Hua et al., "Parsimonious 2D prestack Kirchhoff depth migration," Geophysics vol. 68 No. 3, pp. 1043-1051, Society of Exploration Geophysicists, Tulsa, Oklahoma, Jun. 2003.
Masters et al., "Beam Pre-stack Depth Migration Algorithm in a 3D PSDM Non-exclusive reprocessing Project, Wergipe-Alagoas Basin," 9th International Congress of the Brazilian Geophysical Society, Salvador, Brazil, Sep. 11-14, 2005.
Fomel et al., "Regularizing seismic inverse problems by model reparameterization using plane-wave construction," Geophysics vol. 71 No. 5, pp. A43-A47, Society of Exploration Geophysicists, Tulsa, Oklahoma, Oct. 2006.
Gao et al., "Fast Beam Migration—A Step Toward Interactive Imaging," Proceedings of the 76th Annual International Meeting of the Society of Exploration Geophysicists, pp. 2470-2474, New Orleans, Louisiana, Oct. 2006.
Bleistein et al., "Modeling, Migration and Inversion with Gaussian Beams, Revisited," Society of Exploration Geophysicsists Annual Meeting, San Antonio, Texas, Sep. 23-28, 2007.
Fomel, Sergey, "Shaping regularization in geophysical estimation problems," Geophysics vol. 72, No. 2, pp. R29-R36, Society of Exploration Geophysicists, Tulsa, Oklahoma, Mar. 2007.
Fomel, Sergey, "Velocity-independent time-domain seismic imaging using local event slopes," Geophysics vol. 72 No. 3, pp. S139-S147, Society of Exploration Geophysicists, Tulsa, Oklahoma, Jun. 2007.
Kravtsov et al., "Gaussian beams in inhomogeneous media: a review," Studia Geophysica et Geodaetica vol. 51 Issue 1, pp. 1-36, Institute of Geophysics of the Academy of Sciences of the Czech Republic, Prague, Czech Republic, Jan. 2007.
Fomel et al., "Time-domain seismic imaging using beams," 79th Annual International Meeting of the Society of Exploration Geophysicists, Houston, Texas, Oct. 25-30, 2009.
Sherwood et al., "3D beam prestack depth migration with examples from around the world," The Leading Edge vol. 28 No. 9, pp. 1120-1127, Society of Exploration Geophysicists, Tulsa, Oklahoma, Sep. 2009.
Tanushev et al., "Gaussian beam decomposition of high frequency wave fields," Journal of Computational Physics vol. 228, pp. 8856-8871, Elsevier Inc., Amsterdam, Netherlands, Sep. 2009.
Liu et al., "Error estimates for gaussian beam superpositions," UCLA Computational Applied Mathematics Publications, University of California Los Angeles, Los Angeles, California, Aug. 2010.
Tanushev et al., "Gaussian beam decomposition for seismic migration," 81st Annual Meeting of the Society of Exploration Geophysicists, San Antonio, Texas, Sep. 18-23, 2011.
Popovici et al., "Fast Beam Migration Using Plane Wave Destructor (PWD) Beam Forming," 75th European Association of Geophysicists Conference & Exhibition incorporating the Society of Petroleum Engineers Europe, London, United Kingdom, Jun. 10-13, 2013.

* cited by examiner

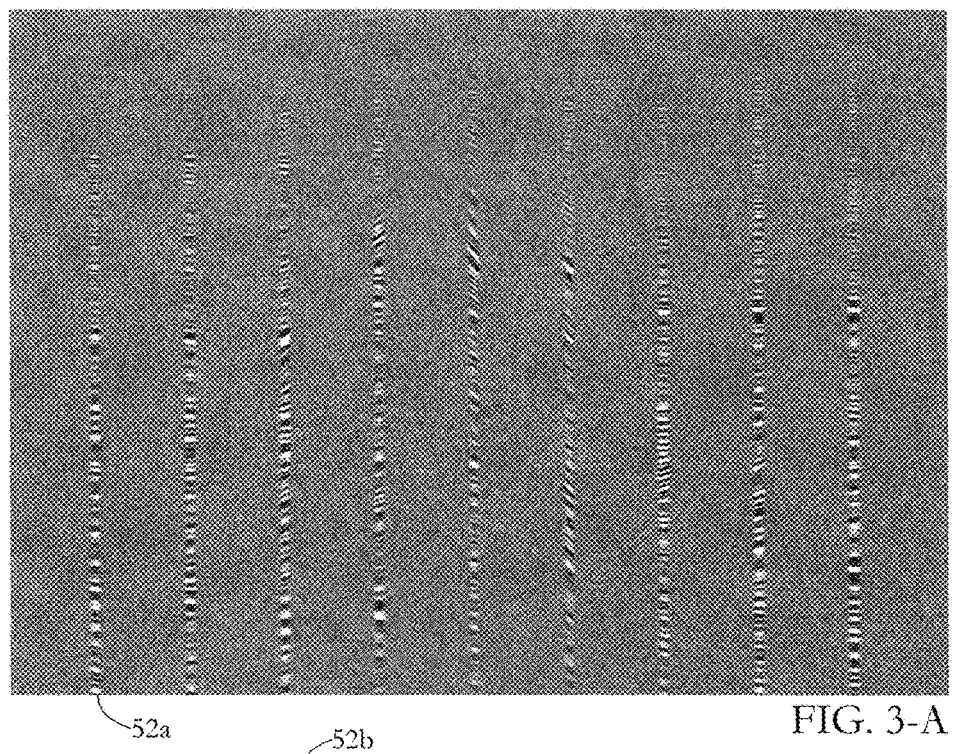
FIG. 3-A
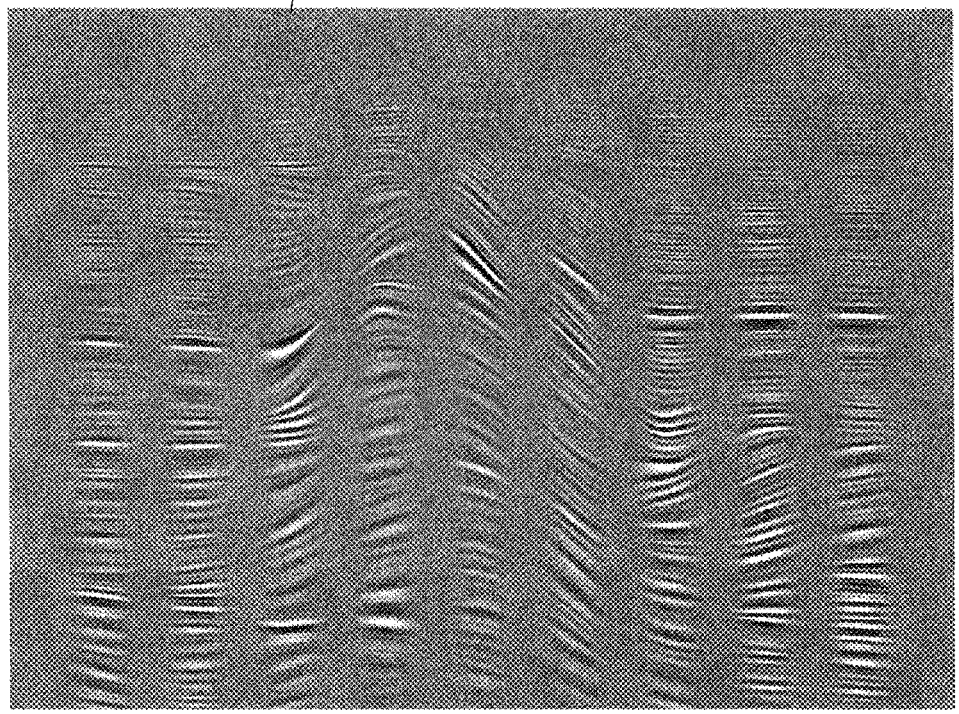
FIG. 3-B

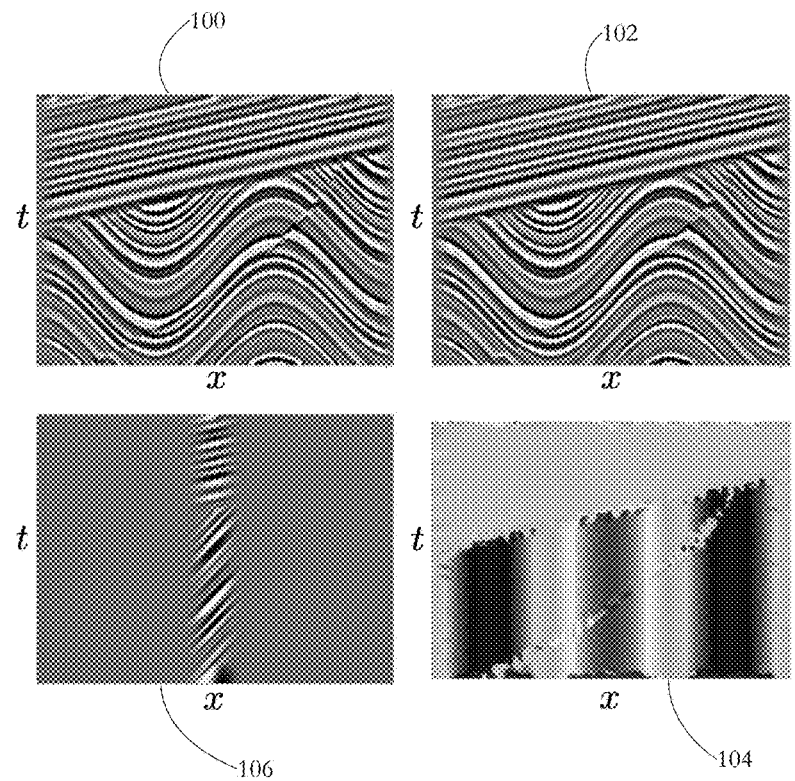
FIG. 3-C
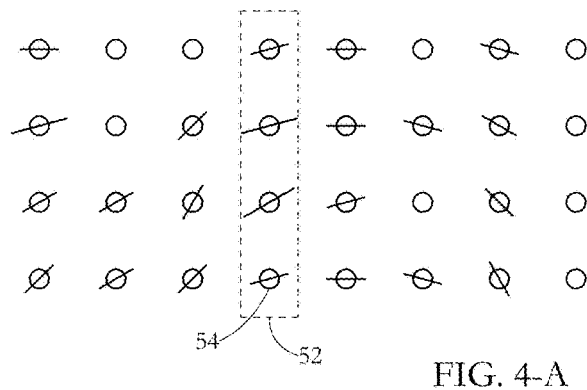
FIG. 4-A
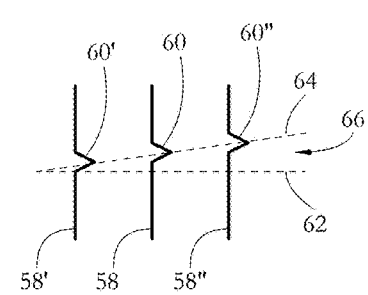
FIG. 4-B

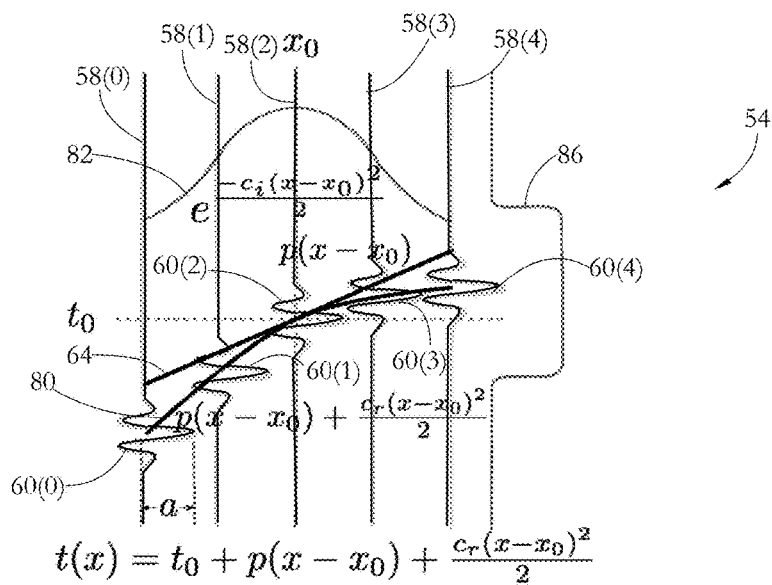
FIG. 4-C
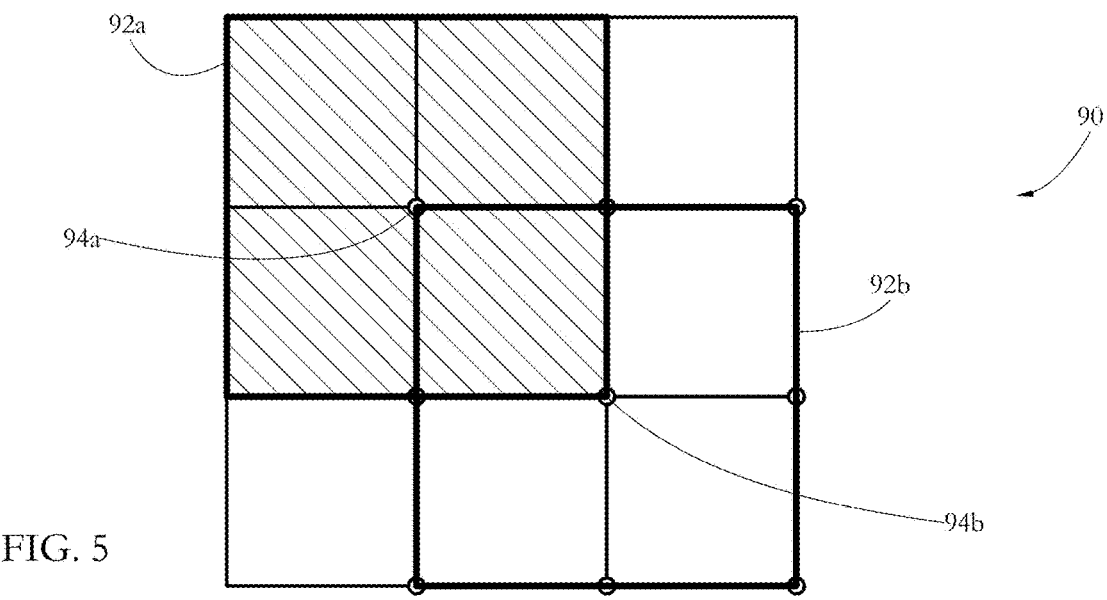
FIG. 5

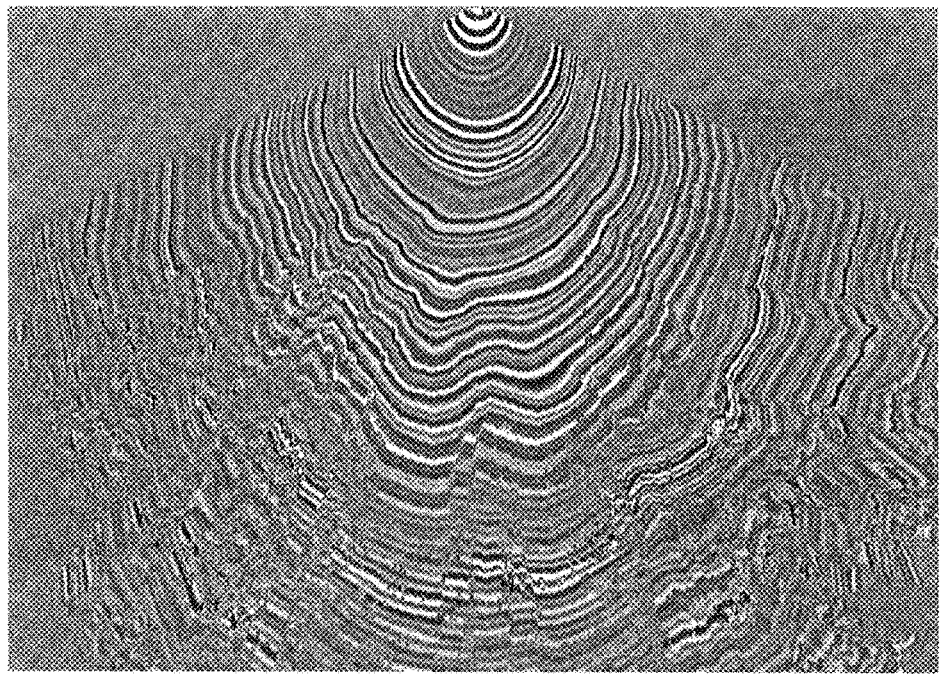
FIG. 6-A
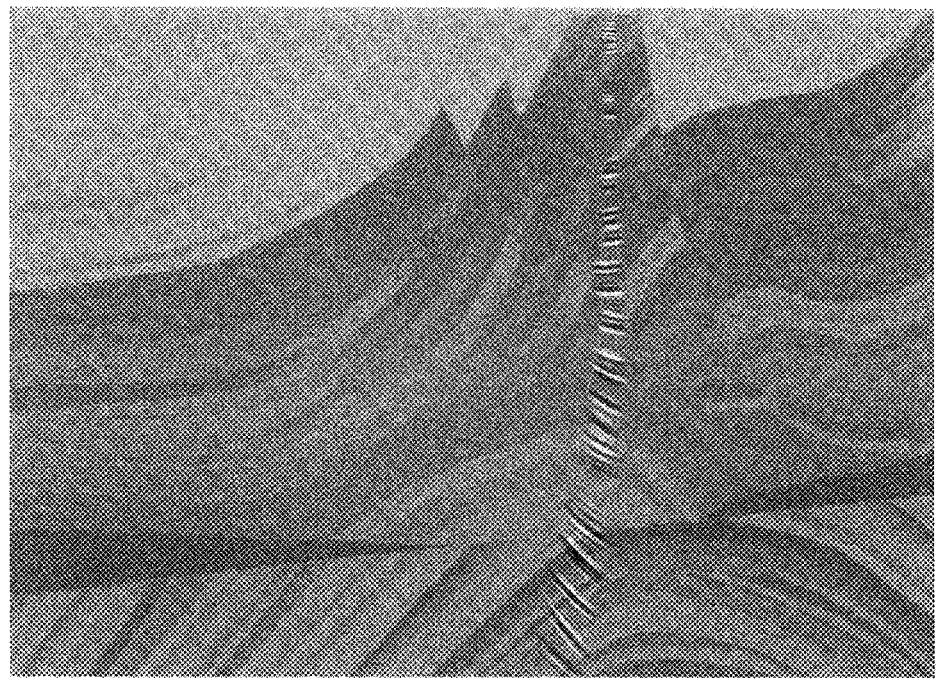
FIG. 6-B

FAST BEAM MIGRATION USING PLANE-WAVE DESTRUCTOR (PWD) BEAM FORMING

RELATED APPLICATION DATA

This application claims the benefit of the filing date of U.S. Provisional Patent Application No. 61/678,358, filed Aug. 1, 2012, which is herein incorporated by reference.

BACKGROUND

The invention relates to systems and methods for geophysical data processing, and in particular to seismic imaging systems and methods.

Generating images of subsurface structures is a key component of the search for oil and gas deposits. Accurate imaging decreases the chances of drilling expensive dry wells, allowing a reduction in the cost of oil exploration and production, and a reduction in dependence on foreign oil.

Kirchhoff migration methods are commonly used for seismic imaging. In Kirchhoff migration, the energy of an event on a trace is propagated to all possible reflection points in the model space. After all events on all traces are propagated, an image is generated by stacking (summing) all individual contributions. Stacking reinforces in-phase energy corresponding to true reflectors, and cancels out-of-phase energy that does not correspond to a true reflector.

Conventional seismic imaging methods are generally computationally intensive and time-consuming. A turnaround time of 6-8 months is not uncommon for a medium to large depth imaging project corresponding to an area of a few hundred to a few thousand square miles. Speeding up the generation of accurate seismic images allows the 3D seismic data to be used more effectively to characterize and delineate oil and gas reservoirs and to monitor enhanced oil recovery processes, and decreases the probability of making drilling mistakes due to incorrect subsurface image and geopressure information.

SUMMARY

According to one aspect, a seismic data processing method comprises employing a computer system comprising at least one processor to: apply a plane-wave destructor filter to a plurality of seismic traces to determine a wavefield orientation for a seismic beam at a beam-forming location in space; form at least part of the seismic beam at the beam-forming location in space according to the determined wavefield orientation; and perform a beam migration using the seismic beam to generate a seismic image corresponding to the plurality of seismic traces.

According to another aspect, a non-transitory computer readable medium encodes instructions which, when executed by a computer system, cause the computer system to: apply a plane-wave destructor filter to a plurality of seismic traces to determine a wavefield orientation for a seismic beam at a beam-forming location in space; form at least part of the seismic beam at the beam-forming location in space according to the determined wavefield orientation; and perform a beam migration using the seismic beam to generate a seismic image corresponding to the plurality of seismic traces.

According to another aspect, a computer system comprises at least one processor programmed to form: a beam forming module configured to apply a plane-wave destructor filter to a plurality of seismic traces to determine a wavefield orientation for a seismic beam at a beam-forming location in space, and form at least part of the seismic beam at the beam-forming location in space according to the determined wavefield orientation; and a beam migration module connected to the beam-forming module and configured to perform a beam migration using the seismic beam to generate a seismic image corresponding to the plurality of seismic traces.

BRIEF DESCRIPTION OF THE DRAWINGS

The foregoing aspects and advantages of the present invention will become better understood upon reading the following detailed description and upon reference to the drawings where:

FIG. 3-A shows a number of five-trace beams formed using plane wave destructor filters according to some embodiments of the present invention.

FIG. 3-B shows a number of twenty-five-trace beams formed using plane wave destructor filters according to some embodiments of the present invention.

FIG. 3-C shows a synthetic model, a corresponding data reconstruction via beam forming, a corresponding dip field section, and a data beam example according to some embodiments of the present invention.

FIG. 4-A illustrates prestack data decomposition in locally-coherent events (wavelets) using plane-wave destructor (PWD) filters, and a corresponding dip for a locally-coherent event, according to some embodiments of the present invention.

FIG. 4-B illustrates an exemplary beam locally-coherent event (wavelet) characterized by a dip and curvature, according to some embodiments of the present invention.

FIG. 4-C illustrates an exemplary locally-coherent event according to some embodiments of the present invention.

FIG. 5 shows an exemplary beam-forming superbin according to some embodiments of the present invention.

FIG. 6-A shows an exemplary Kirchhoff impulse response.

FIG. 6-B shows an exemplary fast beam migration (FBM) impulse response according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
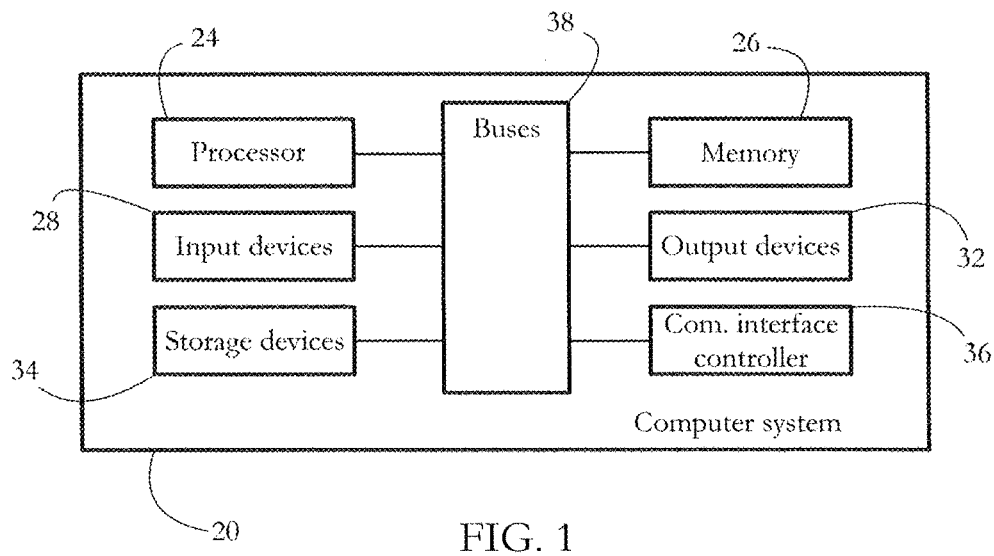
FIG. 1 shows an exemplary hardware configuration of a seismic data processing system according to some embodiments of the present invention.

FIG. 1 shows a hardware configuration of an exemplary computer system 20 according to some embodiments of the present invention. Computer system 20 comprises a processor 24 having one or more processing cores, a random access memory (RAM) 26, a set of input devices 28 (e.g. keyboard, mouse, touchpad), a set of output devices 32 (e.g. monitors, speakers), a set of storage devices 34 (e.g. hard disk drives, solid state drives), and a network interface controller 36, all connected to each other via a set of buses 38.

Figure 2:
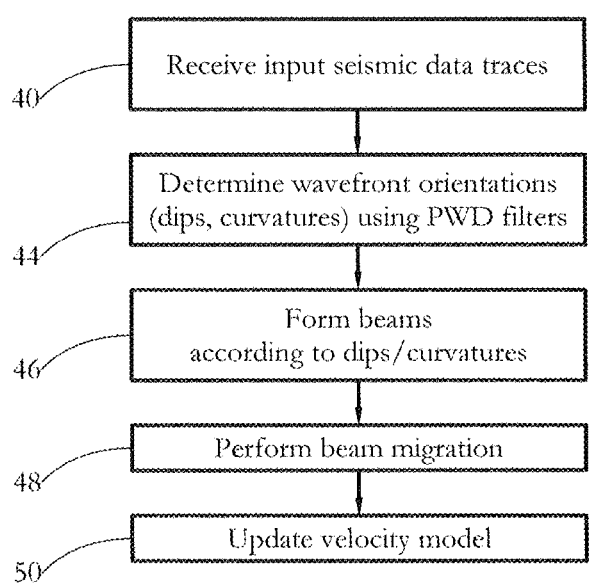
FIG. 2 shows a sequence of steps performed in a seismic data processing method according to some embodiments of the present invention.

FIG. 2 shows an exemplary sequence of steps performed according to some embodiments of the present invention. In a step 40, a plurality of input seismic data traces and associated subsurface seismic velocity model are retrieved from storage and/or over a communications link. The seismic data traces are the result of a seismic survey conducted using a grid of sources and receivers with known positions overlaying a subsurface volume of interest. The volume of interest may include hydrocarbon (oil/gas) deposits. Common seismic surveys may use seismic sources such as explosives, air guns, and/or thumper trucks, and seismic receivers such as hydrophones and/or geophones. Each trace corresponds to a one source and one receiver location. A trace is a time-dependent amplitude of a seismic signal sensed by the receiver in response to a seismic pulse originating at the source. A wavefront originating at the source travels through the subsurface volume of interest and is reflected back toward the receiver by subsurface structures. The input seismic data traces are processed as described below to generate one or more images of the volume of interest.

In a step 44, a wavefront orientation is determined at each of a plurality of seismic trace locations defined in space and time using a plane wave destructor (PWD) filter as described below. In some embodiments, the wavefront orientation may include a dip (slope) and a curvature. The curvature represents a second and/or higher order characterization of the spatial variation.

In a step 46, a beam is formed at each of a plurality of seismic trace locations defined in space, according to the determined wavefield orientations. The beams are migrated using a fast beam migration method to generate an image of volume of interest (step 48). In some embodiments, the velocity model is updated in a step 50 using results of the fast beam migration.

FIG. 3-A-B shows a number of exemplary beams 52a-b according to some embodiments of the present invention. FIG. 3-A shows a number of five-trace (across 1-D) beams 52a constructed using plane-wave destructor (PWD) filters as described below, while FIG. 3-B shows a number of twenty-five-trace (across 1-D) beams 52b constructed using PWD filters. Only some of the beams are plotted, in order to delineate each beam. The example data (Claerbout, J. and Brown, M., 1999, "Two Dimensional Textures and Prediction-Error Filters," 61$^{st}$ Mtg. Eur. Assoc. Expl. Geophys., Extended Abstracts, Session 1009) shows a synthetic model, which resembles sedimentary layers with a plane unconformity and a curvilinear fault. Using five-trace beams allow reducing the input data by a factor of five, while using twenty-five trace beams allows reducing the input data by a factor of twenty-five. A data reduction by a factor of five is generally invertible, i.e. the original trace data can be obtained from the beams without significant precision loss. A larger reduction is generally not invertible; the original data cannot be fully recovered from the data beam. At the same time, at larger data compression rates, the beam-forming process averages out more noise while retaining the coherent energy in the data, yielding increased signal-to-noise ratios (SNR). An improved SNR reduces the presence of image artifacts and makes images easier to interpret in complex areas.

FIG. 3-C shows a synthetic model 100, a corresponding data reconstruction 102 via beam forming, a corresponding dip field section 104, and a data beam example 152 according to some embodiments of the present invention. The dip (slope) field illustrated at 104 is computed from input trace data using a prediction filter, and the computed dips are used to decompose the input data into beams such as beam 152, as described in more detail below.

FIG. 4-A illustrates a number of locally-coherent seismic events (wavelets) 54 forming corresponding beams 52, according to some embodiments of the present invention. A beam 52 corresponds to a single spatial location and a range of times/depths. A plurality of locally-coherent events 54 at a particular spatial location, each corresponding to a different range of times/depths, forms a beam. In some embodiments, each locally-coherent event 54 is characterized by an arrival time, location, amplitude, orientation (dip), curvature, and spatial extent. In FIG. 4-A, amplitudes and event dips are denoted by the lengths and angles, respectively, of the lines representing events 54.

FIG. 4-B illustrates an event orientation (dip) 66 for a locally-coherent event 54. Consider three exemplary traces 58, 58', 58" adjacent in space, shown in FIG. 4-B. The vertical direction denotes time (or depth), while the signal deviation along the horizontal axis denotes the amplitude recorded by the receiver at the corresponding time. Traces 58, 58', 58" include corresponding reflection events 60, 60', 60" characterized by higher amplitudes than previous and subsequent time points along the corresponding trace. Reflection events 60, 60', 60" can be fit to a line 64, which defines a local wavefront orientation (dip). The angle 66 between line 64 and the horizontal 62 defines the local slope or dip.

FIG. 4-C illustrates an exemplary locally-coherent event 54 centered at a location $x_0$ and time $t_0$, having a temporal extent defined by a temporal window 86 centered on the seismic event, a spatial extent defined by a spatial Gaussian envelope (taper) 82, and a shape defined by a parabolic traveltime curve 80. The dip p is the slope of the line shown at 64, which is defined by reflection events 60(0)-60(4) of corresponding adjacent traces 58(0)-58(4). An exemplary event 60(0) has an amplitude a. The local parabolic curvature is controlled by the real part $c_r$ of the quadratic coefficient in the series expansion of the traveltime curve at the location ($t_0$, $x_0$). In some embodiments, the temporal window 86 has an extent on the order of hundreds of milliseconds, for example an extent between 100 ms and 300 ms, in particular about 200 ms.

The local traveltime curve at any given input location ($t_0$, $x_0$) can be expressed as the truncated series expansion:

$$T(x) = t_0 + p_0(x - x_0) + \frac{c}{2}(x - x_0)^2, \quad (1)$$

The local linear slope of the curve is determined by $p_0$, while $c$ is a measure of the local parabolic curvature. A Gaussian wavelet T centered at ($t_0$, $x_0$) can be constructed by allowing the curvature to be complex-valued ($c = c_r + ic_i$):

$$T(x) = t_0 + p_0(x - x_0) + \frac{c_r + ic_i}{2}(x - x_0)^2 \quad (2a)$$

In 2-D, i.e. for 3-D migration, eq. (2a) becomes, for a Gaussian wavelet $T(x,y)$, $$T(x, y) = t_0 + p_0(x - x_0) + q_0(y - y_0) + \quad (2b)$$
$$\frac{1}{2}c_{11}(x - x_0)^2 + c_{12}(x - x_0)(y - y_0) + \frac{1}{2}c_{22}(y - y_0)^2$$

wherein $p_0$ and $q_0$ are the local dips along the x- and y-axes, respectively, and $c_{11}$, $c_{12}$ and $c_{22}$ are curvature coefficients.

The curvature of the wavelet is controlled by the real part of c, while the extent from the center (amplitude taper) of the wavelet and corresponding beam is controlled by the imaginary part of c. Equation (2) also suggests that one can define a complex traveltime having a real and an imaginary part of the traveltime, i.e., $T=T_r+iT_i$). To confirm that this formula indeed constructs a Gaussian beam, b(t, x), one can look at the forward and inverse Fourier transforms for some input gather f(T, x), $$b(t, x) = \frac{1}{2\pi} \int_{-\infty}^{\infty} \int_{-\infty}^{\infty} f(T, x) e^{-\omega T_i} e^{i\omega(T_r - t)} dT d\omega \quad (3)$$

to see the more familiar exponential form of the Gaussian function. One can now recognize the wavelet as the input event multiplied by a decaying Gaussian weight centered at ($t_0$, $x_0$), with a slope of $p_0$, and a curvature controlled by $c_r$.

The equations above can be extended to two dimensions by considering each x in the equations to be a vector having x and y components. FIG. 5 shows an exemplary 2-D beam-forming superbin grid 90 according to some embodiments of the present invention. A first superbin 92a corresponding to a beam center 94a overlaps an adjacent superbin 92b corresponding to a beam center 94b. Superbin 92a is hashed in FIG. 5. In some embodiments, each superbin has a size on the order of hundreds of meters along each spatial axis, for example about 400-500 meters, while the grid intervals are on the order of hundreds of meters in size, for example about 200-250 meters. The bin size and grid intervals may be entered by a user, using for example a graphical user interface, according to input data and other parameters such as the noise present in the input data, the spacing between traces, and the desired compression of data.

In some embodiments, forming a beam at a location $x=(x_0, y_0)$ includes selecting a sequence of spaced-apart times and constructing a wavelet for each time according to eq. (2) (with $t_i$ used instead of $t_0$ in the equation) by determining values of p and $c_r$ that best fit the recorded trace data, i.e. the data of the trace at location x and the data of neighboring traces in the beam superbin. In particular, a plane destructor filter (described below, see eq. (8)) embodying corresponding dip and curvature values is used to shift all neighboring traces to the beam center and put the traces on the same time-grid. In some embodiments, a plane destructor filter may embody only dip values, rather than dip and curvature values. In some embodiments, the amplitudes of the traces are then averaged to form the beam. In some embodiments, a median or other representative amplitude may be chosen instead of an average.

In some embodiments, the same amplitude taper ($c_i$) is used for all wavelets forming a beam. The amplitude taper may be chosen so as to yield a desired beam width and/or spreading characteristics. Smaller values of $c_i$ yield relatively wide beams, and corresponding assumptions built into migration have reduced validity. Larger value of $c_i$ may make the beam initially spread quickly, which may also reduce the validity of migration assumptions.

In some embodiments, the beam formation is done in D(t,x,y,h) coordinates for common azimuth data and D(t,x,y,h,a) for wide azimuth data, or directly in D(t,Sx,Sy,Gx,Gy) coordinates, where (x,y,h,a) are CDP inline and crossline coordinates, offset and azimuth, and (Sx,Sy,Gx,Gy) are shot and receiver X,Y coordinates. Such superbins are 400-500 meters wide in each of the spatial axes with the centers on a uniform grid with intervals around 200-250 meters. In the article "Beam Pre-Stack Depth Migration Algorithm in a 3D PSDM Non-Exclusive Reprocessing Project, Sergipe-Alagoas Basin," Ninth International Congress of the Brazilian Geophysical Society, Salvadaor, Brazil, September 2005, Masters and Sherwood report that such a decomposition has additional regularization benefits, compensating for acquisition footprint and also control anti-aliasing even for very steep dips, thus FBM does not suffer from the aliasing effects typically encountered in the standard Kirchhoff migration.

In some embodiments, plane wave destructor (PWD) filters as described below are used to construct the wavelets according to the values of p and $c_r$ that best fit the recorded trace data. In some embodiments, forming a wavelet includes identifying the dip and curvature that yield a desired output (e.g. zero) for a plane-wave destructor filter applied to the recorded data of two adjacent traces.

In some embodiments, more than one dip at a given space and time location may be identified using one of several techniques described below. Determining multiple dips may be particularly relevant at particular locations that lie along multiple geological features, for example at the intersection of different reflectors such as a layer and a fault having different orientations. Determining multiple dips may allow more accurate imaging of subsurface structures, since echoes from different subsurface structures sometimes appear on top of each other in the recorded data. A single dip generally allows extracting information about one such structure from the locations where reflections overlap.

In some embodiments, several PWD filters can be cascaded for more than two traces to identify more than one dip at the same space and time location. Each filter destroys plane waves that have the same slope (orientation) as the slope of the filter. If two wavefield orientations are present at the same location, then applying a first filter with the correct slope destroys the first plane wave, while applying a subsequent second filter with the correct slope destroys the second plane wave.

In some embodiments, multiple wavefield orientations at a fixed beam-forming center may be determined by keeping track of several directions for which a PWD filter identifies a plane wave. The PWD filter may be seen as a function over the space of wavefield orientations and seismic data that produces a single number that indicates how closely the seismic data resembles a plane wave with the given orientation. Keeping track of several directions at a given beam-forming center may then be viewed as similar to finding several local extreme points (minimums or maximums) of a multi-dimensional function (the PWD filter).

In some embodiments, multiple wavefield orientations at a fixed beam-forming center may be determined by identifying a dominant wavelet orientation, determining a wavelet associated with the dominant orientation, subtracting the determined wavelet from the seismic data, and then repeating the process to identify a new dominant wavelet orientation in the resulting data. Iterating such a procedure yields multiple wavefield orientations at a given beam-forming location.

Plane Wave Destructor Filters

Plane-wave destruction (PWD) filters characterize seismic data by a superposition of local plane waves. They are constructed as finite-difference stencils for the plane-wave differential equation. In many cases, a local plane-wave model is a very convenient representation of seismic data. We can define the basis of the plane-wave destruction filters as the local plane differential equation:

$$\frac{\partial P}{\partial x} + \sigma \frac{\partial P}{\partial t} = 0 \qquad (4)$$

where P(t,x) is the wave field, and a is the local slope, which may also depend on t and x. In the case of a constant slope, equation (4) has the simple general solution $$P(t,x)=f(t-\sigma x), \qquad (5)$$

where f(t) is an arbitrary waveform. Equation (5) is the mathematical description of a plane wave.

If the slope σ does not depend on t, we can transform equation (4) to the frequency domain, where it takes the form of the ordinary differential equation $$\frac{\partial \overline{P}}{\partial x} + i\omega\sigma\overline{P} = 0 \qquad (6)$$

And has the general solution:

$$\overline{P}(x)=\overline{P}(0)e^{i\omega\sigma x}, \qquad (7)$$

where $\overline{P}$ is the Fourier transform of P. The complex exponential term in equation (7) simply represents a shift of a t-trace according to the slope σ and the trace separation x. In the frequency domain, the operator for transforming the trace at position (x-1) to the neighboring trace and at position x is a multiplication by $e^{i\omega\sigma}$.

In other words, a plane wave can be perfectly predicted by a two-term prediction-error filter in the F-X (Fourier transform) domain:

$$a_0\overline{P}(x)+a_1\overline{P}(x-1)=0 \qquad (8)$$

where $a_0=1$ and $a_1=-e^{i\omega\sigma}$. Eq. (8) shows a plane-wave destructor filter that can be used to shift a trace to a neighboring (e.g. beam center) position, for averaging into a beam as described above. The values of the two coefficients $a_0=1$ and $a_1=-e^{i\omega\sigma}$ define an instance of the plane wave destructor filter. The coefficient $a_1=-e^{i\omega\sigma}$ depends on the slope a, which reflects the dip and/or curvature values described above. The curvature is relevant when there are more than two traces, in which case the slope σ may be a function of the distance between the traces. A different value of the slope σ is used for each pair of traces, according to the distance between the traces.

The goal of predicting several plane waves can be accomplished by cascading several two-term filters. In fact, any F-X prediction-error filter represented in the Z-transform notation as $$A(Z_x)=1+a_1Z_x+a_2Z_x^2+\ldots+a_NZ_x^N \qquad (9)$$

can be factored into a product of two-term filters:

$$A(Z_x) = \left(1 - \frac{Z_x}{Z_1}\right)\left(1 - \frac{Z_x}{Z_2}\right)\ldots\left(1 - \frac{Z_x}{Z_N}\right) \qquad (10)$$

where $Z_1, Z_2, \ldots, Z_N$ are the zeroes of polynomial (9). The Z-transform transforms a discrete time-domain signal into a complex frequency-domain representation. According to equation (8), the phase of each zero corresponds to the slope of a local plane wave multiplied by the frequency. Zeroes that are not on the unit circle carry an additional amplitude gain not included in equation (6).

In order to incorporate time-varying slopes, we can return to the time domain and look for an appropriate analog of the phase-shift operator of eq. (7) and the plane-prediction filter of eq. (8). A property of plane-wave propagation across different traces is that the total energy of the propagating wave stays invariant throughout the process: the energy of the wave at one trace is completely transmitted to the next trace. This property is assured in the frequency-domain solution of eq. (7) by the fact that the spectrum of the complex exponential $e^{i\omega\sigma}$ is equal to one. In the time domain, we can reach an equivalent effect by using an all-pass digital filter.

In the Z-transform notation, convolution with an all-pass filter takes the form $$\overline{P}_{x+1}(Z_t) = \overline{P}_x(Z_t)\frac{B(Z_t)}{B\left(\frac{1}{Z_t}\right)} \qquad (11)$$

where $P_x(Z_t)$ denotes the Z-transform of the corresponding trace, and the ratio $B(Z_t)/B(1/Z_t)$ is an all-pass digital filter approximating the time-shift operator $e^{i\omega\sigma}$.

In finite-difference terms, equation (11) represents an implicit finite-difference scheme for solving equation (4) with the initial conditions at a constant x. The coefficients of filter $B(Z_t)$ can be determined, for example, by fitting the filter frequency response at low frequencies to the response of the phase-shift operator. The Taylor series expansion around zero frequency gives the expression $$B_3(Z_t) = \frac{(1-\tau)(2-\tau)}{12}Z_t^{-1} + \frac{(2-\tau)(2-\tau)}{6} + \frac{(1+\tau)(2+\tau)}{12}Z_t \qquad (12)$$

for a three-point centered filter $B_3(Z_t)$ and the expression $$B_5(Z_t) = \frac{(1-\tau)(2-\tau)(3-\tau)(4-\tau)}{1680}Z_t^{-2} + $$
$$\frac{(4-\tau)(2-\tau)(3-\tau)(4+\tau)}{420}Z_t^{-1} + \frac{(4-\tau)(3-\tau)(3+\tau)(4+\tau)}{280} +$$
$$\frac{(4-\tau)(2+\tau)(3+\tau)(4+\tau)}{420}Z_t + \frac{(1+\tau)(2+\tau)(3+\tau)(4+\tau)}{1680}Z_t^2 \quad (13)$$

for a five-point centered filter $B_5(Z_t)$. Equations (12-13) can be extended to longer filters using a recursion relation.

Filter coefficients such as the ones shown in equations (12-13) can be used to generate a prediction filter used to compute the slopes (dips) in the synthetic model shown at 100 in FIG. 3-C. The dip field shown at 104 in FIG. 3-C is used to decompose the data in beams such as beam 152.

In some embodiments, a dip is calculated as follows: a candidate (tentative) dip is selected, and a PWD filter using the candidate dip is applied to the input trace data. If the candidate dip matches the trace data, the PWD filter outputs a zero. If the traces have noise and/or the candidate dip is not perfectly chosen, the filter output will be a non-zero residual. The candidate dip is adjusted according to the residual so as to yield as small a residual as possible using a minimization algorithm such as a Nelder-Mead or Gauss-Newton algorithm. The process is repeated until the residual is minimized according to an end condition. The end condition may include a comparison of the current residual to a predetermined threshold (e.g. determining whether the residual is sufficiently close to zero), and/or a comparison of the current residual to one or more previously-computed residuals (e.g. determining whether the latest PWD step reduced the residual magnitude).

In some embodiments, a residual for two seismic wavelets centered at a given sampling time, for two neighboring traces $Tr(x_0)$, $Tr(x_1)$ at locations $x_0$, $x_1$, respectively, is computed as $$\sum_{k=-w}^{w} \left| Tr(x_0, k) - \sum_{j=-2}^{2} a_j Tr(x_1, k+j) \right| \quad (14)$$

wherein k indexes time, w is the half-width of the seismic wavelet in samples, ‖ represents a norm, such as the absolute value or the square of the absolute value, and $a_j$ are the coefficients shown in Eq. (13). For example, for a candidate dip p, the coefficient $a_{-1}$ in Eq. (13) is $$a_{-1} = \frac{(4-p)(2-p)(3-p)(4+p)}{420}, \quad (15)$$

and corresponding expressions are used for the other coefficients. The residual of eq. (14) characterizes the closeness of actual data at a neighboring time/space location to data predicted for that location by a PWD filter using a given dip.

In some embodiments, to achieve compression and/or de-noising of the beam-formed seismic data, a beam wavelet may be represented in terms of a small number frequency-domain coefficients (e.g. wavelet transform coefficients). Once the wavelet coefficients are determined, the coefficients can be thresholded (coefficients below a certain size be zeroed-out), or another method may be used to reduce the number of coefficients that represent the wavefield. Other methods for storing the coefficients efficiently may include, without limitation, representing the coefficients with an analytic function or quantizing the coefficients' values. Storing only such compressed coefficients requires less storage space and may eliminate some of the noise components present in uncompressed data.

Beam Migration

In some embodiments, the beam wavelet with its auxiliary attributes (beam extent, wavefront curvature) is used to form a limited-wavefront Kirchhoff migration for each pre-stack depth volume. As a skilled artisan will appreciate, to perform such a limited-wavefront Kirchhoff migration, one ray from the receiver and one ray from the source are traced in a known velocity model for each beam using the wavefield orientation information for the beam. The place and time at which the two rays meet are found using the beam time and the rays. At this meeting point, the beam wavelet is spread into the seismic image. Summing the contributions to the image from all beams forms the migrated image. As noted above, each beam wavelet is migrated separately, and by combining the effect from multiple beams to form the migration impulse response, we can observe local multipathing propagation. Unlike in Kirchhoff migration, where a seismic event is moved to all possible reflection points, beam migration uses dip information to move a seismic event to the actual reflector location, which is a small patch of the surface of all possible reflectors. Such a beam migration approach does not suffer from the aperture limitations of the standard Kirchhoff implementation, allowing the imaging of very steep and overturning dips while maintaining the complete aperture of the input data. This procedure allows for a higher signal to noise image compared to the standard Kirchhoff, where data from millions of traces may not have the necessary amplitude to cancel the migration swings in complex areas such as sub-salt. The true amplitude necessary for AVO friendly processing is also better preserved. Input wavelets can be excluded from the output image at this stage, for example by estimating the focusing quality factor, providing the means for reducing the coherent noise typically present in the deeper migrated areas. Finally, residual moveout can be applied to the migrated gathers for better final stacking, or used in successive tomography iterations for improving the velocity model.

Exemplary Results

The figures described below show exemplary results generated according to some embodiments of the present invention. The figures are illustrative rather than limiting.

FIGS. 6-A-B illustrate differences between a Kirchhoff impulse response and a beam migration impulse response, according to some embodiments of the present invention. FIG. 6-A shows an exemplary Kirchhoff impulse response, which fills almost the entire volume. FIG. 6-B shows an exemplary beam migration impulse response 252, which has a more limited spatial extent.

DISCUSSION

Large input 3-D seismic datasets are typically tens to hundreds of terabytes in size. During processing the size can expand to thousands or tens of thousands of terabytes, through phase-space unrolling or by generating extended image gathers. Exemplary embodiments described above allow generating seismic images using Fast Beam Migration (FBM), an ultra-fast imaging algorithm based on decomposing the pre-stack data into locally coherent events, or beam wavelets, using PWD filters. FBM methods allow for very fast imaging iterations (order of minutes for imaging thousands of square kilometers), which combined with very fast migration velocity analysis tools, including wide-azimuth tomography, provide greater resolution and accuracy than what can be accomplished today with standard imaging technology. FBM may enable an order of magnitude more effective imaging of complex geologic structures. In some embodiments, FBM methods as described above may be two to three orders of magnitude (100-1,000 times) faster than standard industry technology such as reverse time migration, shot profile migration, common azimuth migration or Kirchhoff migration.

The faster imaging allows for more iterations of velocity model building (e.g. 30-40 iterations, instead of the more common 5-10), which enable the processing team to enhance the seismic resolution and imaging of complex geologic structures. The processing may be monitored in real-time and intermediate output may be visualized and analyzed throughout the process. Improved velocity models in combination with FBM or wave-equation imaging can provide greater resolution and accuracy than what can be accomplished today with standard imaging technology. Such advanced imaging methodology can improve the success rate and cost effectiveness for new deep-field discoveries, reduce the turnaround time for large surveys, and help increase recovery efficiency for the development of existing fields, or 4-D seismic monitoring of $CO_2$ injection and sequestration projects. Such techniques are of particular use in imaging ultra-deep land and water, complex oil-and-gas reservoirs.

It will be clear to one skilled in the art that the above embodiments may be altered in many ways without departing from the scope of the invention. Accordingly, the scope of the invention should be determined by the following claims and their legal equivalents.

What is claimed is:

1. A seismic data processing method comprising employing a computer system including at least one processor to:
    apply a plane-wave destructor filter to a plurality of seismic traces to determine a wavefield orientation at a target time for a seismic beam at a beam-forming location in space;
    form at least a part of the seismic beam at the target time and the beam-forming location in space according to the determined wavefield orientation; and
    perform a beam migration using the seismic beam to generate a seismic image of a subsurface volume characterized by the plurality of seismic traces.

2. The method of claim 1, wherein the wavefield orientation has a dip component and a curvature component.

3. The method of claim 2, further comprising determining the dip component and the curvature component that fit the data of the plurality of seismic traces according to a value of a residual determined for two seismic wavelets corresponding to two immediately neighboring traces at the beam-forming location in space.

4. The method of claim 3, comprising determining the value of the residual according to a sum $$\sum_{k=-w}^{w} \left| Tr(x_0, k) - \sum_{j=-2}^{2} a_j Tr(x_1, k+j) \right|$$

wherein Tr represents trace data, k indexes time, $x_0$ and $x_1$ represent locations of the two traces, w is a half-width of the seismic wavelets in samples, | | represents a norm, and $a_j$ are a set of coefficients.

5. The method of claim 1, wherein forming at least part of the seismic beam at the target time and beam-forming location comprises shifting data from the plurality of seismic traces to a beam center according to the determined wavefield orientation, and averaging shifted trace amplitudes at the beam center to generate at least part of the seismic beam.

6. The method of claim 1, wherein forming at least part of the seismic beam at the target time and beam-forming location comprises selecting a median amplitude from the plurality of seismic traces as a beam amplitude at the target time and beam-forming location.

7. The method of claim 1, further comprising applying a plurality of plane-wave destructor filters to determine a plurality of wavefield orientations at the target time for the seismic beam at the beam-forming location in space, and performing the beam migration according to the plurality of wavefield orientations.

8. The method of claim 1, further comprising compressing the seismic beam by applying a frequency-domain transform to the seismic beam data.

9. A non-transitory computer-readable medium encoding instructions which, when executed by a computer system cause the computer system to:
    apply a plane-wave destructor filter to a plurality of seismic traces to determine a wavefield orientation at a target time for a seismic beam at a beam-forming location in space;
    form at least part of the seismic beam at the target time and the beam-forming location in space according to the determined wavefield orientation; and
    perform a beam migration using the seismic beam to generate a seismic image of a subsurface volume characterized by the plurality of seismic traces.

10. The computer-readable medium of claim 9, wherein the wavefield orientation has a dip component and a curvature component.

11. The computer-readable medium of claim 10, wherein the instructions further cause the computer system to determine the dip component and the curvature component that fit the data of the plurality of seismic traces according to a value of a residual determined for two seismic wavelets corresponding to two immediately neighboring traces at the beam-forming location in space.

12. The computer-readable medium of claim 11, wherein the value of the residual is determined according to a sum $$\sum_{k=-w}^{w} \left| Tr(x_0, k) - \sum_{j=-2}^{2} a_j Tr(x_1, k+j) \right|$$

wherein Tr represents trace data, k indexes time, $x_0$ and $x_1$ represent locations of the two traces, w is a half-width of the seismic wavelets in samples, | | represents a norm, and $a_j$ are a set of coefficients.

13. The computer-readable medium of claim 9, wherein forming at least part of the seismic beam at the target time and beam-forming location comprises shifting data from the plurality of seismic traces to a beam center according to the determined wavefield orientation, and averaging shifted trace amplitudes at the beam center to generate at least part of the seismic beam.

14. The computer-readable medium of claim 9, wherein forming at least part of the seismic beam at the target time and beam-forming location comprises selecting a median amplitude from the plurality of seismic traces as a beam amplitude at the target time and beam-forming location.

15. The computer-readable medium of claim 9, wherein the instructions further cause the computer system to apply a plurality of plane-wave destructor filters to determine a plurality of wavefield orientations at the target time for the seismic beam at the beam-forming location in space, and perform the beam migration according to the plurality of wavefield orientations.

16. The computer-readable medium of claim 9, wherein the instructions further cause the computer system to compress the seismic beam by applying a frequency-domain transform to the seismic beam data.

17. A computer system comprising at least one processor programmed to:
apply a plane-wave destructor filter to a plurality of seismic traces to determine a wavefield orientation at a target time for a seismic beam at a beam-forming location in space;
form at least part of the seismic beam at the target time and the beam-forming location in space according to the determined wavefield orientation; and
perform a beam migration using the seismic beam to generate a seismic image of a subsurface volume characterized by the plurality of seismic traces.

18. The computer system of claim 17, wherein the wavefield orientation has a dip component and a curvature component.

19. The computer system of claim 18, wherein the at least one processor is programmed to determine the dip component and the curvature component that fit the data of the plurality of seismic traces according to a value of a residual determined for two seismic wavelets corresponding to two immediately neighboring traces at the beam-forming location in space.

20. The computer system of claim 19, wherein the value of the residual is determined according to a sum $$\sum_{k=-w}^{w} \left| Tr(x_0, k) - \sum_{j=-2}^{2} a_j Tr(x_1, k+j) \right|$$

wherein Tr represents trace data, k indexes time, $x_0$ and $x_1$ represent locations of the two traces, w is a half-width of the seismic wavelets in samples, $|\ |$ represents a norm, and $a_j$ are a set of coefficients.

21. The computer system of claim 17, wherein forming at least part of the seismic beam at the target time and beam-forming location comprises shifting data from the plurality of seismic traces to a beam center according to the determined wavefield orientation, and averaging shifted trace amplitudes at the beam center to generate at least part of the seismic beam.

22. The computer system of claim 17, wherein forming at least part of the seismic beam at the target time and beam-forming location comprises selecting a median amplitude from the plurality of seismic traces as a beam amplitude at the target time and beam-forming location.

23. The computer system of claim 17, wherein the at least one processor is programmed to apply a plurality of plane-wave destructor filters to determine a plurality of wavefield orientations at the target time for the seismic beam at the beam-forming location in space, and perform the beam migration according to the plurality of wavefield orientations.

24. The computer system of claim 17, wherein the at least one processor is programmed to compress the seismic beam by applying a frequency-domain transform to the seismic beam data.

* * * * *